United States Patent [19]
Rhodes

[11] Patent Number: 5,644,290
[45] Date of Patent: Jul. 1, 1997

[54] BLACKOUT CONTROL SYSTEM

[76] Inventor: Michael E. Rhodes, Rte. 3, Box 930, Big Fork, Minn. 56628

[21] Appl. No.: 498,433

[22] Filed: Jul. 5, 1995

Related U.S. Application Data

[63] Continuation-in-part of Ser. No. 77,094, Jun. 16, 1993, Pat. No. 5,434,553.

[51] Int. Cl.$^6$ .................................................. B60Q 1/00
[52] U.S. Cl. ...................... 340/468; 340/463; 340/471; 340/472; 340/479; 307/10.8
[58] Field of Search ............................. 340/463, 468, 340/471, 472, 479; 307/10.8

[56] References Cited

U.S. PATENT DOCUMENTS

| | | | |
|---|---|---|---|
| 3,697,946 | 10/1972 | Nishioka | 340/478 |
| 4,037,195 | 7/1977 | Wojslawowicz | 340/471 |
| 4,249,160 | 2/1981 | Chilvers | 340/471 |
| 4,670,736 | 6/1987 | Ulrich | 307/10.8 |
| 4,678,925 | 7/1987 | Grocke | 307/10.8 |
| 4,812,808 | 3/1989 | Ulrich | 340/471 |
| 4,845,465 | 7/1989 | Kruse et al. | 340/468 |
| 4,859,988 | 8/1989 | Holtvluwer | 340/471 |
| 4,939,503 | 7/1990 | Swanson | 340/431 |
| 5,081,565 | 1/1992 | Nabha et al. | 307/10.8 |
| 5,434,553 | 7/1995 | Rhodes | 340/468 |

*Primary Examiner*—Jeffery Hofsass
*Assistant Examiner*—Edward Lefkowitz
*Attorney, Agent, or Firm*—Richard C. Litman

[57] ABSTRACT

An improved blackout control system located within the passenger compartment allows the driver to alter the normal and emergency lighting features of the vehicle. The blackout control system comprises an illuminated control panel unit modified by harness and control units which are attached to the lighting system of a conventional emergency vehicle. Three emergency "Red" switches are provided as an improvement on the control panel. A fourth blackout switch is provided on the panel which disables the brake and backup lights of the vehicle. A fifth switch for blacking out the tail lights, parking and/or corner lights is provided. A sixth sneak light switch is provided to activate a hooded sneak light located in front of the vehicle which may be used to provide less lighting in front of the vehicle than the normal horizontally disposed headlights. Other modifications are: (1) reduction of the switch panel and switch illumination for daytime, nighttime or blackout driving; (2) safety reset of blacked out lighting; (3) interior dome light extinguished while the red lights are on; and optional flashing features of emergency lights in the blackout system including the substitution of turn signal lights in smaller unmarked vehicles for the red grill lights of marked squad cars. Bypass plug-in units are provided for inactivating the blackout control system without requiring the removal of the blackout control system harness from a vehicle.

19 Claims, 8 Drawing Sheets

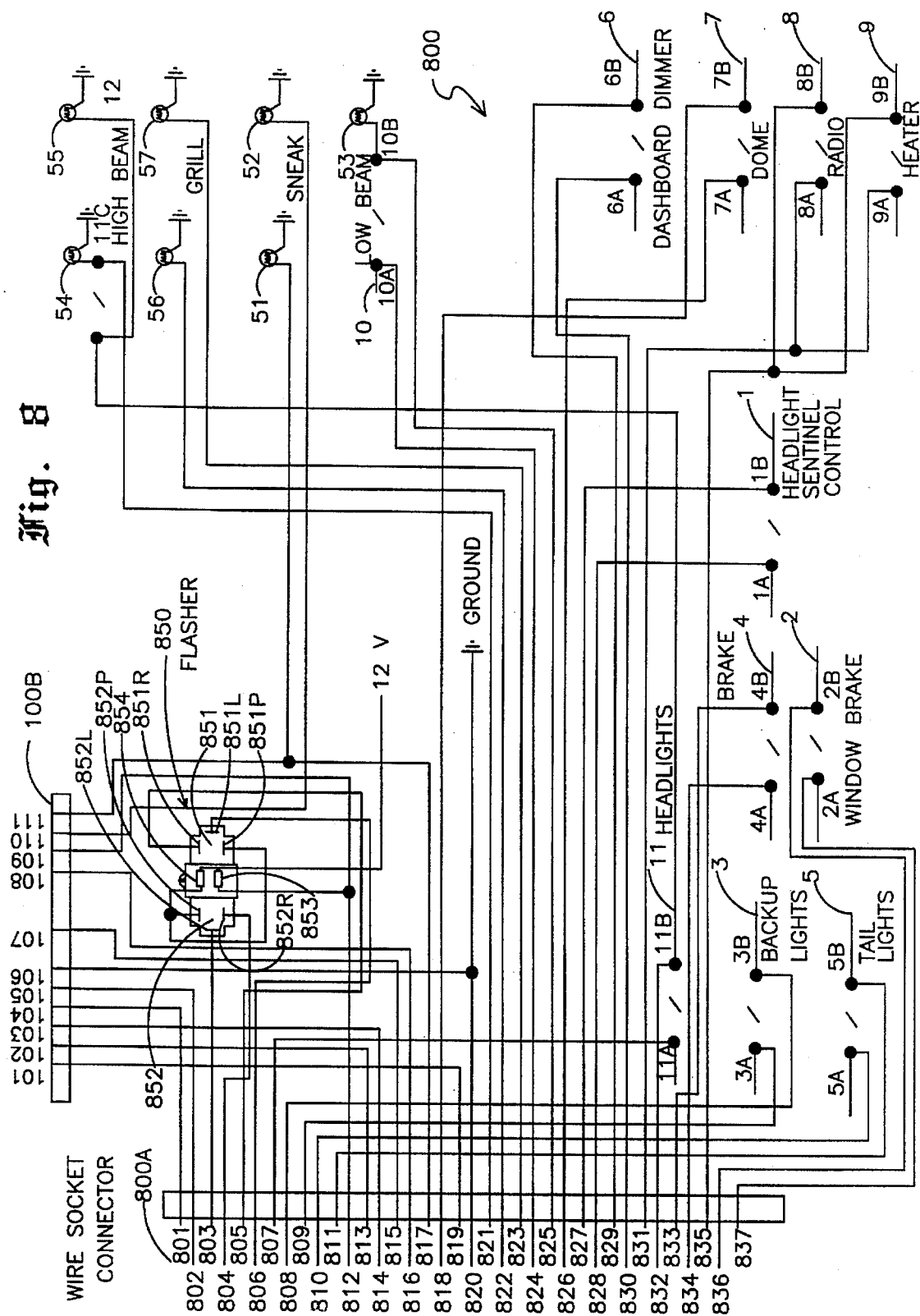

BLACKOUT CONTROL SYSTEM

This application is a continuation-in-part of application Ser. No. 08/077,094, filed Jun. 16, 1993, now U.S. Pat. No. 5,434,553.

BACKGROUND OF THE INVENTION

1. Field of the Invention

The present invention relates to an improved blackout control system for lighting control systems installed within an emergency or police vehicle for altering the control of the lighting features of the vehicle. The blackout control system comprises an improved control panel unit, a harness unit and a control unit. The improved blackout control system of the present invention pertains to those lighting control systems installed within emergency or police vehicles for blacking out selectively one or more of the following vehicle lighting devices: one or both headlights, interior dome light, brake lights, tail lights, back-up lights, dashboard lights, and the control panel lights to render the vehicle less visible to those outside the vehicle. Several bypass plug-in units are provided for the convenience of bypassing the improved blackout control system in the event servicing of different control systems is required or if a return to the original lighting system is desired without expensive removal of the blackout control system.

2. Description of the Prior Art

Lighting control devices for altering the conventional lighting features of a vehicle are located between the switching arrangements of the vehicle, such as the running lights switch, the high beam switch, etc., and the lights under their control. These devices allow for special lighting features to be added to the conventional lighting features of the vehicle. Some of the devices allow for an override of the special lighting features to allow the lighting features to operate in the conventional manner when desired by the user.

U.S. Pat. No. 4,037,195 issued Jul. 19, 1977, to Jack Edward Wojslawowicz describes a vehicular signal light control system which includes silicon-controlled-rectifiers of the gate-turn-off type to selectively control the current to the running lights.

U.S. Pat. No. 4,249,160 issued Feb. 3, 1981, to Graham R. Chilvers describes a vehicle mounted light activated control system for operating warning lights which includes a light sensor and a comparator. The comparator then triggers a time delay threshold device which switches on the warning lights for ten seconds, and only when the sensed light intensity of an approaching vehicle exceeds a threshold.

U.S. Pat. No. 4,678,925 issued Jul. 7, 1987, to Diethelm Grocke describes a dashboard lighting switch and switch lever for a motor vehicle.

U.S. Pat. No. 4,812,808 issued Mar. 14, 1989, to Larry F. Ulrich describes an electronic control circuit for controlling vehicle lights. An electronic circuitry board which has emergency circuitry to include tail lights with brake lights, front running lights, turn indicator lights with a switch, an emergency switch, and a brake light switch.

U.S. Pat. No. 4,939,503 issued Jul. 3, 1990, to Carl S. Swanson describes a wiring device system for a towed vehicle which couples the signal lights of both vehicles.

U.S. Pat. No. 5,081,565 issued Jan. 14, 1992, to Ali M. Nabha et al., describes a daytime running light system for a vehicle by employing level sensing comparators to effect reduced illumination of the high beam headlamps.

None of the above inventions and patents, taken either singly or in combination, is seen to describe the instant invention as claimed.

SUMMARY OF THE INVENTION

The device of the present invention provides for an improved blackout switch panel for a blackout control system having a wiring harness insertable within an emergency or police vehicle. The wiring harness is inserted within the already existing wiring arrangement of the vehicle controlling the various lighting features of the vehicle. Attachable to the wiring harness is a control unit which, under the control of the inventive switching panel located within easy reach of the driver, may interrupt certain lighting features of the vehicle.

Bypass plug-in units are provided for the convenience of bypassing the three improved blackout control systems in the event servicing of the control system is required or if a return to the original lighting system is desired without expensive removal of the blackout control system.

More particularly, certain lighting features are extinguished in order to render the vehicle or its operations less evident to others outside the vehicle, and inside the vehicle to eliminate glare in an officer's eyes from the radio and heater control lights on the dashboard or the glare from the blackout switch panel. This device is intended for use in emergency vehicles, in particular, police squad cars. At the discretion of a trained professional, the operations of the vehicle may be made less apparent to those outside the vehicle. This may prove useful under certain situations. For example, if a squad car passes a suspect in a parked car at night, the officer would have several additional options to investigate without the suspect becoming suspicious of the surveillance. The officer could select any of the following procedures according to the specific circumstance: (a) prevent the brake, interior dome, and backup lights from coming on so as to allow the officer to back up his squad car without detection; (b) stop the squad car, let his partner out of the squad car, and go on foot to investigate; (c) drive out of view after passing the suspect, extinguish all his lights, and turn on his sneak light, thereby allowing him to pull up to the parked car without detection and turn on the police emergency lights to catch the suspect off guard; or (d) drive by a suspect car in the evening with the squad car's headlights on, return by extinguishing the right low beam headlight for further investigation to give the appearance of a different car to avoid suspicion. Recently, an officer was killed when the interior dome light was illuminated to expose the unsuspecting officer inside when an armed suspect was pulled over. This danger is minimized with the present system.

Since each of these features, brake lights, running lights (headlights, parking or corner lights and tail lights), and backup lights, are placed within vehicles to insure safe driving, operation of the blackout control systems should only be used by trained professionals.

Accordingly, it is a principal object of the present invention to provide improved blackout control systems insertable within the electrical system of an emergency vehicle such as a police squad car which extinguishes certain lighting features for rendering the vehicle less visible to others outside the vehicle.

It is an object of the invention to provide improved blackout control systems which comprise a blackout switch panel unit, a wiring harness unit, and a blackout control unit.

It is another object of the invention is to provide a blackout control system having special flashing and passing features.

It is a further object of this invention to provide an override control for negating the disabling of blackout lights upon activation of a manually activated switch.

Another object of the invention is to provide bypass plug-in units which permit the return of the vehicle's electrical system to the original state without removal of the improved blackout control systems which include the panel unit and the harness unit by replacing the control unit with the plug-in unit.

It is a further object of this invention to reduce the blackout switch panel lighting for evening blackout operations.

Another object of this invention is to have the interior dome light remain off when one or more of the emergency red light switches are activated.

It is a further object of this invention to provide a headlight sentinel control feature which activates the headlights in the daytime to make the vehicle more noticeable in traffic.

It is another object of this invention to combine the blackout switch panel with a vehicle's siren head.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 8 is a wiring diagram for a third harness unit attachable to the blackout switch panel unit of FIG. 1 as part of a third embodiment of the present invention.

Similar reference characters denote corresponding features consistently throughout the attached drawings.

DETAILED DESCRIPTION OF THE PREFERRED EMBODIMENTS

Figure 1:
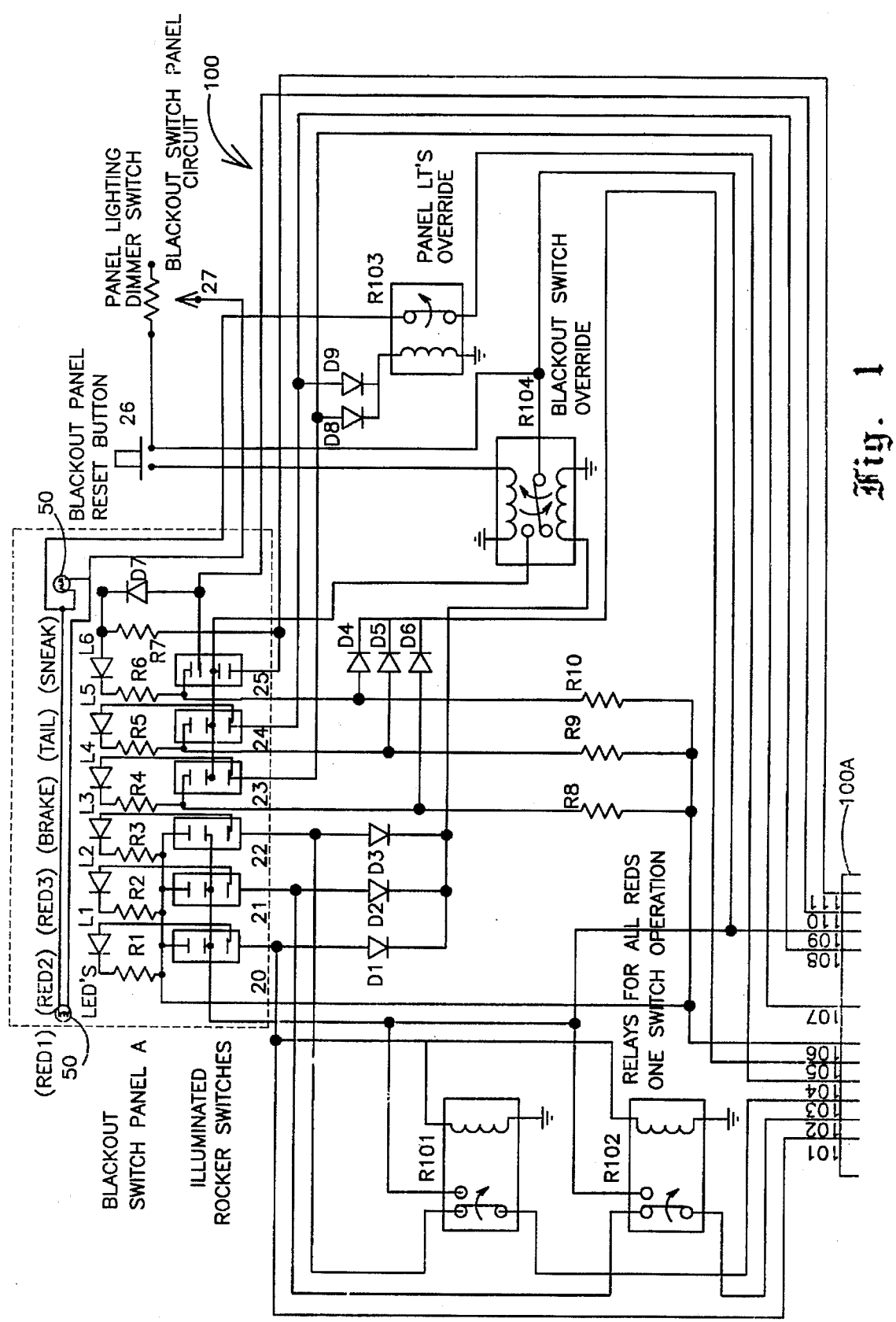
FIG. 1 is a wiring diagram of the blackout switch panel unit of the first embodiment of the present invention and adaptable to the combinations of the second and third embodiments.

The improved blackout switch panel unit 100 as illustrated in FIG. 1 is common to the first three embodiments, and is designed to be connected to a conventional emergency vehicle's electrical wiring system. For the purposes of the present invention, a conventional vehicle's wiring system will include the following components: (1) a brake switch for supplying power to the rear brake lights upon application of the brakes of the vehicle; (2) a backup switch for supplying power to the backup lights upon activation of the reverse gear of the vehicle; (3) a manually activated running light switch to provide, upon activation thereof, power to running lights, i.e., parking or corner lights and tail lights, of the vehicle; (4) a manually activated high beam switch to provide power to the high beam lights of the vehicle when activated; (5) an interior dome light having a connection to the battery and to the door switches for supplying a ground connection to the dome light upon opening a door, thereby allowing current to turn on the inner dome light when a door is opened; (6) a headlight switch which normally controls the headlights when activated fully (also, the running lights' switch when activated either partially or fully); (7) the dashboard dimmer switch of the vehicle may also be controlled by the headlight switch; and (8) the vehicle headlight sentinel control which supplies power to activate the headlights during daytime to make the vehicle more noticeable to daytime traffic.

The digital displays within the vehicle operate in two modes, a daytime mode and a nighttime mode. The automotive manufacturers provide this feature in their vehicles to allow the user to see the bright digital displays clearly during the daytime, while allowing the user to dim the displays in low light situations, such as in the evening. The digital displays of the radio and heater have a built-in bright mode selector switch which shuts off when the running lights are turned on, thereby placing the digital displays in the nighttime mode in which the digital displays are dimmer than in the daytime mode. With the running lights off and the ignition switch on, the digital displays of the heater and radio are placed in the daytime mode and are brightly illuminated so as to be visible during the day.

In FIG. 1, the blackout switch panel circuit 100 has 11 panel connector wires, wires 101–111, which connect directly at 100a to the harness units of any of the three blackout control system embodiments. There are six illuminated rocker switches on the blackout switch panel A as follows: three emergency red light switches 20, 21 and 22 (alternately referred to hereinafter as Red 1, Red 2 and Red 3, respectively, and collectively as Reds); a brake light switch 23; tail light switch 24; and a sneak light switch 25. Each rocker switch has a separate light bulb inside (not shown), and is further illuminated with visible light emitting diodes or LED's L1 through L6 with protective resistors R1 through R6 present in each rocker switch circuit. The blackout switch panel A is illuminated by two panel lights 50 located on the sides of the panel. Red light switches 20, 21 and 22 are directly connected to panel connector wires 101, 102 and 103, respectively, of panel connector bus bar 100A. Switches 23–25 are called blackout switches. Switches 20–24 on the blackout switch panel A are single pole, single throw and on-off self-illuminating switches. Switch 25 is a single pole, double throw, and an on-off-on self-illuminating switch which selectively opens the contact, in the "off position" of the switch, and closes the contact to connect the positive voltage from the battery (FIG. 2) therethrough in the "on position" of the switch. The illumination of the rocker switches 23–25 is decreased in the evening by the insertion of corresponding resistors R8, R9 and R10 in the circuit going to the ground wire 106. Relays R101 and R102 permit one-switch operation by any of Reds 1–3 (20, 21 and 22).

These relays are powered by the vehicle battery through wire 109. The illuminated rocker switches 20–25 are isolated by diodes D1 through D6, respectively. Panel lights override relay R103 permits the cessation of power to two panel lights 50. Diodes D8 and D9 prevent power feedback to the adjoining circuits. Panel lighting dimmer switch 27 permits the manual adjustable dimming of panel lights 50 during the evening hours. When blackout switches 23 and 24 are engaged, panel lights 50 are not illuminated due to the panel lights override relay R103 being manually operated by switches 23 and 24 to prevent panel lights 50 from illuminating. In this circuit, when any of the three emergency red light switches 20–22 are turned on, the current to the other three remaining blackout switches 23–25 is turned off until the red light switches are deactivated and the blackout panel momentary reset button 26 is activated or pressed down. This resetting function is accomplished by the dual coil latching of the blackout switch override relay R104. For example, Red 20 is engaged and supplies a current through its backfeed diode D1 (which prevents power from Reds 21 and 22 from further energizing the circuitry of Red 20), to the blackout switch override relay R104, thus opening the contacts which supply power to the blackout switches. When the operator wishes to reactivate the blackout switches 23–25, the operator will push the reset button 26 to activate the opposite coil of the dual coil override relay R104, thus closing the contacts supplying current to switches 23–25. The reduction in the light intensity of blackout switch panel A is accomplished by the day/night relay R305 (FIG. 3) which removes the ground (panel circuit line 105) to the illuminated rocker switches and LED's, thus forcing the rocker switches and LED's to receive grounding through resistors RS, R9 and R10. By calibration of resistor R8 with the LED and the bulb located inside the rocker switch 23, an acceptable reduction in blackout switch illumination is achieved. If the officer forgets to turn off the blackout switches, not using any of the emergency light switch arrangements, the lights in the switches will come on to full intensity once the headlights are turned off, thus alerting the officer that the blackout switches are still operative. This is accomplished by the reinstatement of the ground at the day/night relay R305 leading to the panel circuit line 105. The power to activate the day/night relay R305 comes from the running lights switch wire 5A of the taillights 5 in FIG. 2.

The rocker switches for Reds 1–3 are labeled as such, but are also visually identified readily by colored LED's positioned above the switches in the blackout panel A, i.e., Red 1 is red, Red 2 is yellow and Red 3 is green. These colors can be interchanged. Red 1 is used for pursuing another vehicle with all the lights on and flashing, i.e., headlights, red grill lights, rear brake, and backup lights. The red rear brake lights and white backup lights have an up and down flash pattern with both brake lights on while both backup lights are off, alternating with backup lights on while the brake lights are off. During this operation the interior dome light is deactivated for an officer's safety as mentioned earlier. Red 1 connects all the red's light switches together for a one-switch operation. Red 2 is utilized after the pursued vehicle has been pulled over with only the flashing red grill lights, rear brake lights and backup lights on. Red 3 is used only for rear lighting of flashing brake and backup lights with the same flashing pattern as with Red 1. With optional switch S301 in FIG. 3 closed, power is allowed to pass through diode D305 and switch S301 to activate the dome light relay R303, thus preventing the dome light from being activated with any of the red emergency lights engaged.

Brake blackout switch 23 cuts out brake, backup and dome lights. Tail lights' switch 24 cuts out or deactivates tail or running lights (parking and tail) and dashboard lighting which includes the lighting of the digital radio and heater displays. The sneak light switch 25 controls two sneak lights on the front of the vehicle (separate from the high and low beam headlights) which have hoods and are directed downward. This switch is a two-position switch for high and low sneak light operation. When the switch is in the upward position, the LED light is bright, and in the downward position, the LED is dim. In the upward position, full power is supplied to the backfeed diode D7 directly to the LED L6, whereas in the downward position, the resistor R7 limits the power or current going to the LED L6 for low sneak light operation.

Another improvement is the provision for the non-illumination of the right low beam headlight during a surveillance of a suspect. The sneak light rocker switch 25 in the low (dim) sneak light position energizes the right low beam light cutout relay R308 (FIG. 3) to terminate power through the circuit of pins 311 and 312, thereby blacking out the right low beam headlight 53 as illustrated in FIG. 2.

Figure 2:
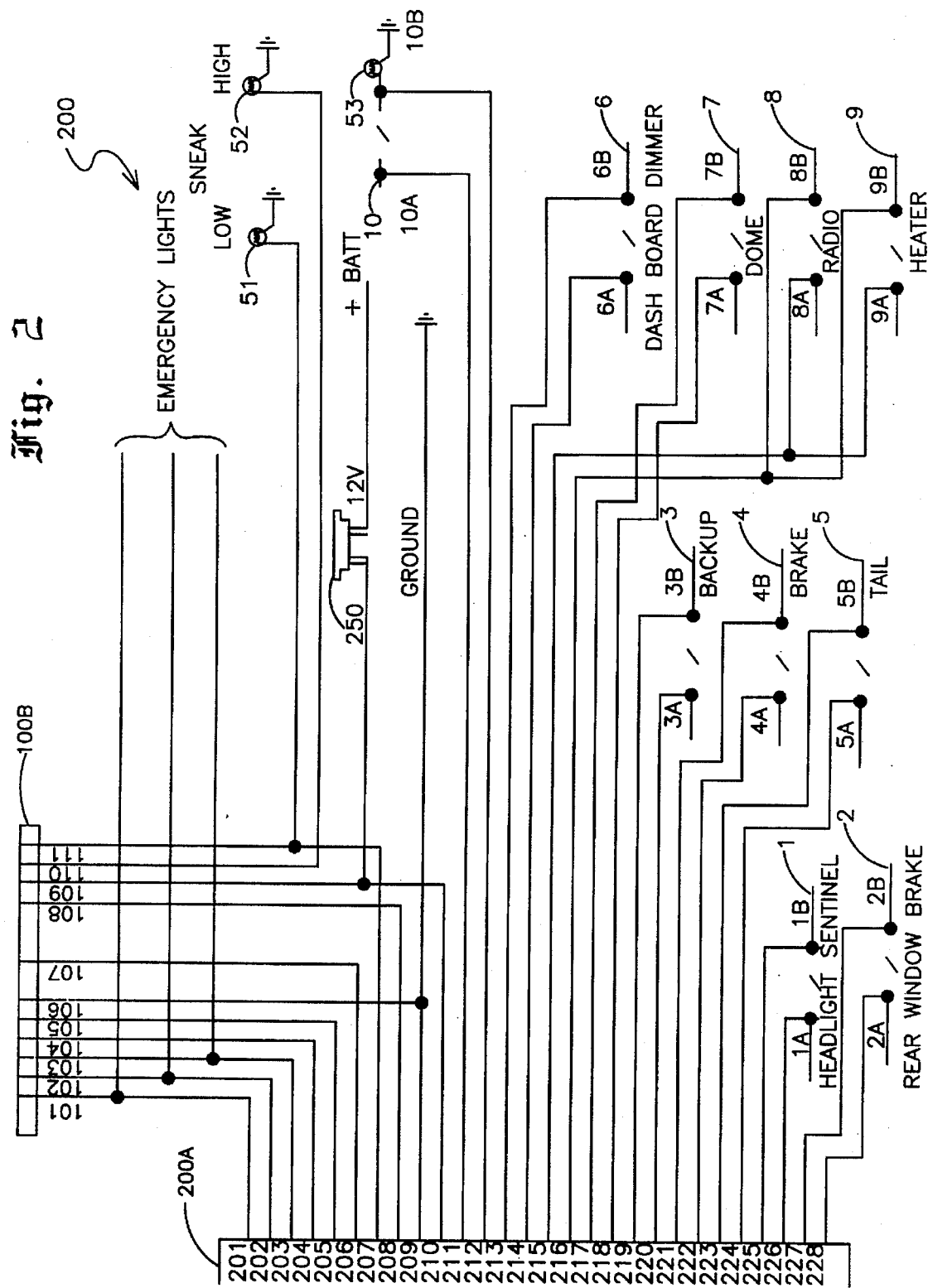
FIG. 2 is a wiring diagram for the harness unit attachable to the blackout switch panel unit of the first embodiment of the present invention.
Figure 3:
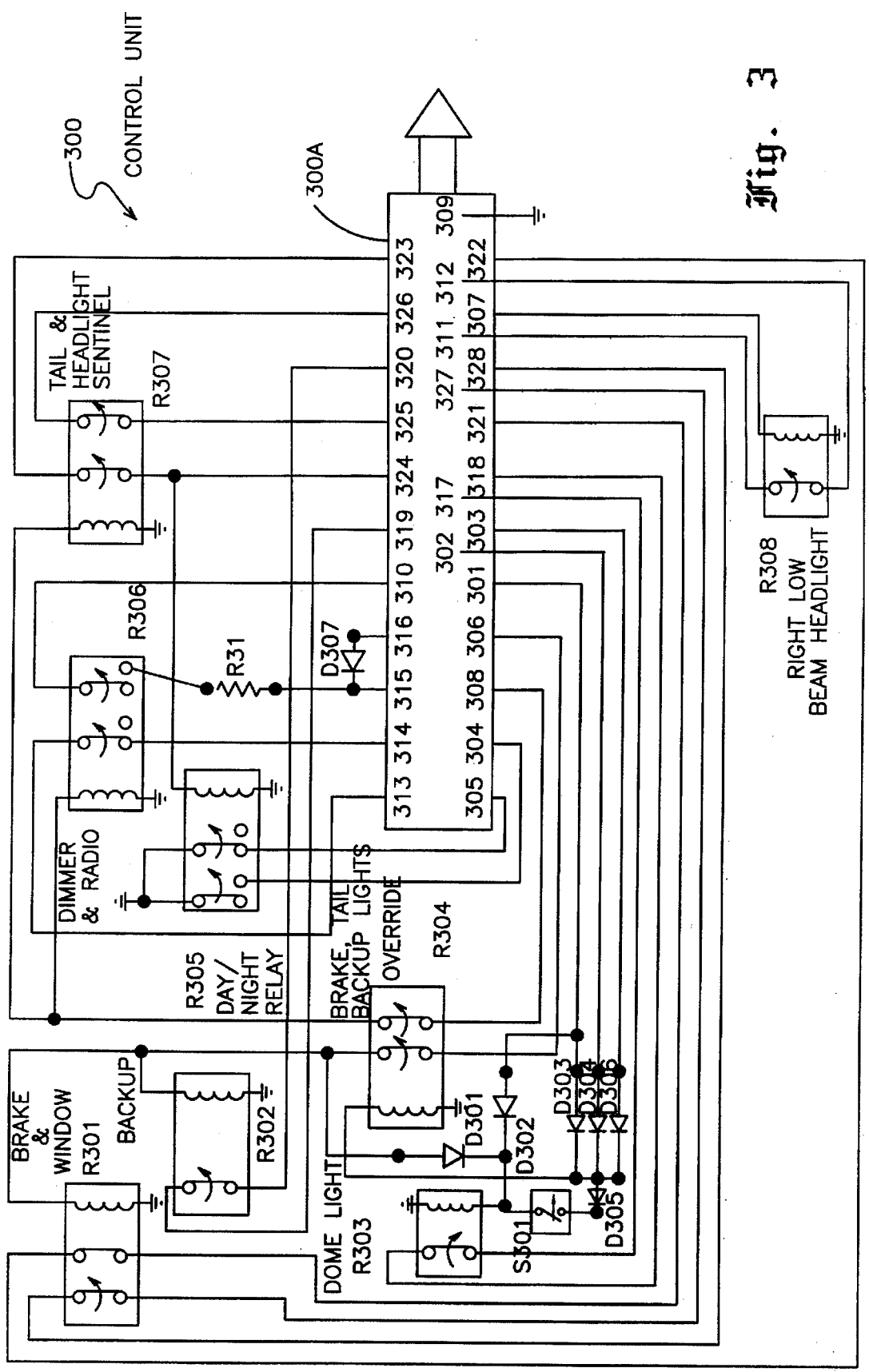
FIG. 3 is a wiring diagram for the control system unit of the first embodiment of the present invention.

The FIG. 2 wiring harness 200 is designed to be installed with the vehicle's present wiring harness between the blackout switch panel circuit 100 of FIG. 1 and the control unit 300 of FIG. 3. Note that panel connector wires 101 through 111 of the panel connector bus bar 100A in FIG. 1 are continued into FIG. 2 as 100B. The wiring harness 200 is attached at one end to various parts of the electrical lighting system of the vehicle, and at the opposite end to a wire socket and pin connector unit 200A having wire sockets and pins 201–228. The power from the battery is transmitted to the illuminated switch panel A through an in-line fuse 250. A ground line is also connected to socket connector wire 209 and to the switch panel A through panel connector wire 106.

More specifically, as shown in FIG. 2, the harness unit 200 includes connections to the illuminated blackout switch panel A which allows a user to perform the following operations: (1) Turn on all the emergency red lights of the vehicle through the use of rocker switches Reds 1–3. (2) Since the FIG. 2 harness is designed with neither emergency red lights nor headlight wig-wagging flashers, the officer will use Reds 1–3 to supply current to the existing emergency lighting system on the patrol car. (3) Cut out the rear window brake light 2, the backup lights 3, the rear brake lights 4, and interior dome light 7 through the use of rocker switch 23. (4) Cut out the headlight sentinel control 1, the taillights 5 or running lights, the dashboard lights 6, radio display lighting 8, and the heater display lighting 9 through the use of rocker switch 24. (5) Turn on only one of the two sneak lights 51 or 52 located in the front of the vehicle through the use of switch 25 in the high or low position. The sneak light 51 or 52 purposefully produces less light than the headlights, and is aimed down at the road at a greater angle than the conventional headlights so as to provide only enough light for the driver to see directly in front of him a predetermined minimum distance while travelling. As mentioned above, sneak light switch 25 in the low position will provide a unique addition in the cutting or non-illumination of the right low beam headlight 53 while the other headlight is left illuminated for a return trip to view the suspects through the use of the cutout relay R308 of FIG. 3 and harness connector wires 211 and 212.

As shown in FIG. 2, the wire socket connector unit 200A has 28 pin connections, i.e., 201–228, wherein panel connector wires 201–205 are directly connected to corresponding numbered pin connections 101–105 in FIG. 1. Note that wires from pins 101–103 also are connected to the emergency lights' wiring which are present in the vehicle. Pins 201–203 are connected to the lines providing power to the police vehicle's emergency lights or Reds 1, 2 and 3. Upon activation of any of the red lights' switches 20, 21 and 22, power is supplied to the respective pins 201–203. Wire 106 is connected to pin 209 which is connected to ground. Wire 107 is connected to pin 206. Wire 108 is connected to pin 208. Wire 109 is connected to pin 210 and to the vehicle's battery with an in-line fuse 250. Wires 110 and 111 are connected to the sneak lights 51 and 52, and wire 111 is also connected to pin 207.

The wires leading to the various following vehicle elements are existing wires. The wire supplying power to the vehicle's headlight sentinel control 1 is cut, and the wire 1A is connected to pin 226 with the wire 1B connected to pin 225. The wire supplying power to the vehicle's rear window brake light 2 is cut, and the wire 2A is connected to pin 228 with wire 2B connected to pin 227. The wire coming from the backup switch and leading to the backup lights 3 is cut, and wire 3A coming from the backup lights 3 is connected to pin 220, while wire 3B going to the backup lights 3 is connected to pin 219. The wire supplying power from the brake lights 4 is cut, and wire 4A supplying the power from the brake lights' switch 23 is connected to pin 222 while the wire 4B leading to the brake lights is connected to pin 221. The wire of the vehicle leading from the running light switch to the tail lights 5 is cut, the wire 5A being connected to pin 224, and the wire 5B being connected to pin 223. The wire coming from the dashboard dimmer light 6 is cut, the wire 6A being connected to pin 214 with the wire 6B being connected to pin 213. The wire coming from the interior dome light 7 which is controlled by the door switch (not shown) is cut. The wire 7A coming from the interior dome light power is connected to pin 218. The wire 7B going to the interior dome light 7 is connected to pin 217. The wire from the radio's (8) digital display is cut, and the wire 8A leading from the radio digital display is connected to pin 215. The wire 8B is connected to pin 216. The wire from pin 215 leading to the heater's (9) display is cut, and wire 9b is connected to pin 216. Wire 8A of the radio display 8 and wire 9A of the heater display 9 are joined and connected to pin 215. Similarly, wires 8B and 9B are connected by pin 216 to the running light switch, and lead to the bright mode selector switches of the radio digital display and the heater digital display. When power is supplied to the bright mode selector switches as the running lights are turned on, the digital displays are placed in their nighttime mode of operation. The power received by wire 8B of the radio display 8 and wire 9B of the heater display 9 are control signals only, placing the displays in their nighttime mode, but do not supply power to the displays. The actual power to light the digital displays when placed in the nighttime mode comes from the wire coming from the vehicle's dashboard dimmer control switch to the display lights so as to allow the driver to adjust the intensity of the digital display lights through the use of the vehicle's dashboard dimmer control switch. The wire leading from the headlight switch to the right low beam headlight 53 is cut, forming wires 10A and 10B connected to pins 211 and 212, respectively.

Some radio manufacturers do not use the dimmer control switch to energize the digital display, but supply power directly from the ignition key switch. Consequently, when the dimmer switch signal is cut, the digital display returns to its daytime bright illumination mode. In this situation, R31 in FIG. 3 is used to regulate the current to the digital display lights as seen by the rheostat on the vehicle dimmer control switch 27 in FIG. 1.

In FIG. 3, the blackout control unit 300 includes a wire plug connector unit 300A which connects to the wire socket connector unit 200A of the harness 200 wired to the vehicle, so as to provide a connection of pins 301 through 328 to, respectively, socket pins 201 through 228. In this manner, the blackout control unit 300 can be removed from the vehicle without having to disconnect the harness 200 by simply disconnecting the wire plug connector unit 300A from the wire socket connector unit 200A. With the wire plug connector 300A connected to the harness, and all switches 20 through 25 of the illuminated switch panel A in the off position, the relay switches of the blackout control unit 300 form the electrical connections of the vehicle prior to the installation of the harness 200.

More specifically, with all of the relays of the blackout control unit 300 deactivated, both of the normally closed switches of the brake and rear window brake lights' blackout relay R301 are closed, thereby allowing the vehicle brake switch (not shown) to activate the rear window brake light (since pins 327 and 328 in the control bus bar 300A are connected), and further allowing the activation of the brake lights because pins 321 and 322 are connected. Further, pins 317 and 318 are normally connected through a switch of the interior dome (or courtesy) light's blackout relay R303 to allow the door switches to energize the interior dome or courtesy light 7. A taillight and headlight sentinel blackout relay R307 has two normally closed switches, one switch connecting pins 325 and 326 which connect wires 1A and 1B (FIG. 2) to allow power from the vehicle wire to reach the taillight and headlight sentinel relay R307. The other normally closed switch of the relay R307 connects pins 323 and 324, thereby allowing the taillights' (5) wire to be activated by the running lights' switch. Further, pins 319 and 320 are connected through a switch in the backup lights blackout relay R302, allowing activation of the backup lights 3. With the blackout control unit 300 attached to the wiring harness unit 200 as discussed above, the user can black out certain lighting features of the vehicle. If the user turned on the taillights' blackout switch 24, power is supplied to pin 108 which is connected to pin 208 of wire socket connector unit 200A. With the blackout override relay R304 deactivated, the switches of relay R307 open from their normally closed positions. Thus, the power from pin 308 of wire plug connector unit 300A goes through the brake, tail and backup lights' override relay R304 supplying power to the relay coil of the taillight and headlight sentinel lights' blackout relay R307. The pins 323, 324, 325, and 326 originally forming circuits in relay R307 are thereby disconnected. In this manner, wires 1A and 1B (FIG. 2) will be disconnected, preventing the headlight sentinel 1 wire from supplying power to the taillight and headlight sentinel blackout relay R307, and preventing the daytime headlights from activating. Further, the wire to the taillights 5 is disconnected, since the switch connecting pins 323 and 324 is opened, thereby disconnecting pins 223 and 224, which in turn disconnects wire 5A from wire 5B. Thus, the tail lights' blackout switch 24 prevents the taillights, headlight sentinel lights, and together with the dimmer-radio relay R306, the digital displays of the heater 9 and radio 8, and dashboard dimmer 6 lighting from coming on.

As illustrated in FIGS. 1–3, if the user activates the brake lights' blackout switch 23, the brake and interior window brake lights' blackout relay R301, the backup lights blackout relay R302, and the interior dome light blackout relay R303 are activated. Power from pin 107 is supplied to pin 206 and pin 306 through the brake, tail and brake lights' override relay R304, and is transmitted through diode D301 to the coil of the interior dome light blackout relay R303, causing the normally closed switch of relay R303 to open. Simultaneously, power from R304 travels to the brake lights blackout relay R301 causing the normally closed switches to open. In this manner, the brake lights 4 and the interior dome light 7 cannot come on. R302 disconnects the backup lights by pins 319 and 320 and brake light blackout relay R301, thereby disconnecting the brake lights 4 by pins 321 and 322 and the rear window brake light 2 by pins 327 and 328.

When the taillight rocker switch 24 is activated, power is supplied to the dimmer and radio blackout relay R306, connecting pin 310 to pin 315, thus directing power to the radio display by line 8A and to the heater display by line 9A. Once power is supplied to wire 8A of radio's (8) digital display and wire 9A of the heater's (9) digital display, the respective displays are placed in their nighttime mode. Note that power is allowed to flow from the running lights' switch to the radio and heater lighting arrangements through the use of diode D307. However, the diode D307 prevents power from flowing to the running lights' switch in order to prevent the running lights from being turned on by power coming from pin 310.

As stated, R305 supplies the ground for the blackout switch panel's daytime mode by pin 305. When energized R305 removes the ground to institute the nighttime mode for reducing the lighting for the blackout switches 23–25 and LED's L4–L6 lighting through the presence of resistors R8, R9 and R10 when the blackout switches are used.

The blackout control system of the present invention is intended to be used in emergency vehicles, especially police squad cars. The blackout features of the first embodiments and the embodiments to follow render the vehicle less visible to others outside the vehicle. These blackout features should be used only by trained professionals who possess the necessary skill and discretion to use these features safely. Each switch of the illuminated switch panel A is illuminated when activated in order to indicate to the driver that the blackout feature provided by the switch is being used. If any of the red light switches, 20–22, i.e., Reds 1, 2 and 3, respectively, are turned on, power is provided to the relay coil of the override relay R304 connected to pins 301, 302 and 303 as shown in FIG. 3. Once the brake, tail and backup override relay R304 is activated, the normally closed switches thereof open. Therefore, even if one or all of the emergency switches Reds 1–3 were activated, they would be overridden, and the relays R301, R302, R306, and R307 would provide connections for allowing the lighting features of the car to operate normally as discussed above.

Figure 4:
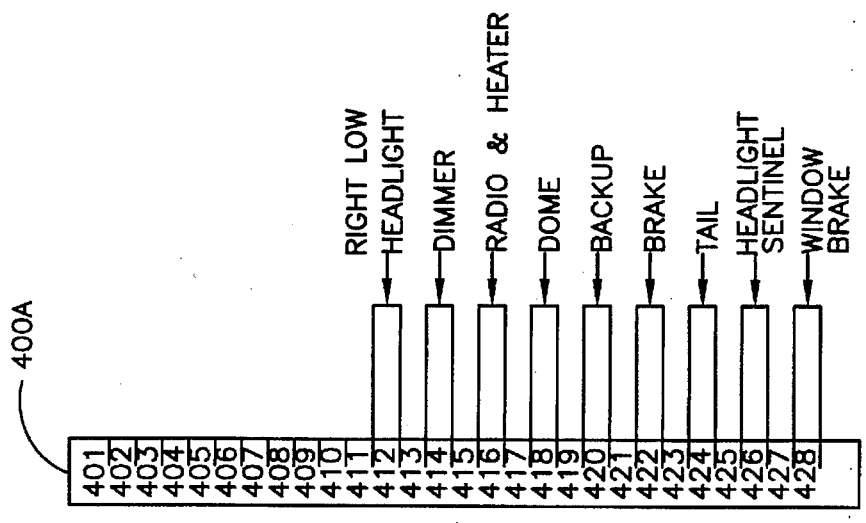
FIG. 4 is a bypass plug-in unit which can be connected to the wiring harness unit of FIG. 2 by replacing the control system unit to nullify the blackout control system of FIGS. 1–3.

FIG. 4 illustrates the bypass plug-in unit 400A which is a bus bar designed to nullify the specific emergency light circuits and specific blackout light circuits installed by reconnecting the original vehicle circuits affected. This plug-in unit is used to replace blackout control unit 300 which is removed. This simple replacement can save the police department an expense in stripping the blackout control system installed by allowing the harness 200, for example, to be left in the vehicle for the resale of the vehicle. Bypass plug-in unit 400A will allow the vehicle to resume its original lighting condition before harness 200 was installed. Pins 411 and 412 are connected by a wire reestablishing connections at 10A and 10B of the right low beam headlight 10, thus returning the right low beam headlight circuit to its original condition. This reconnection is performed with the headlight sentinel 1 wire, the rear window brake light 2 wire, the backup lights 3 wire, the brake lights 4 wire, the taillights 5 wire, the dashboard dimmer 6 wire, the dome light 7 wire, the radio 8 wire, and the heater 9 wire.

Figure 5:
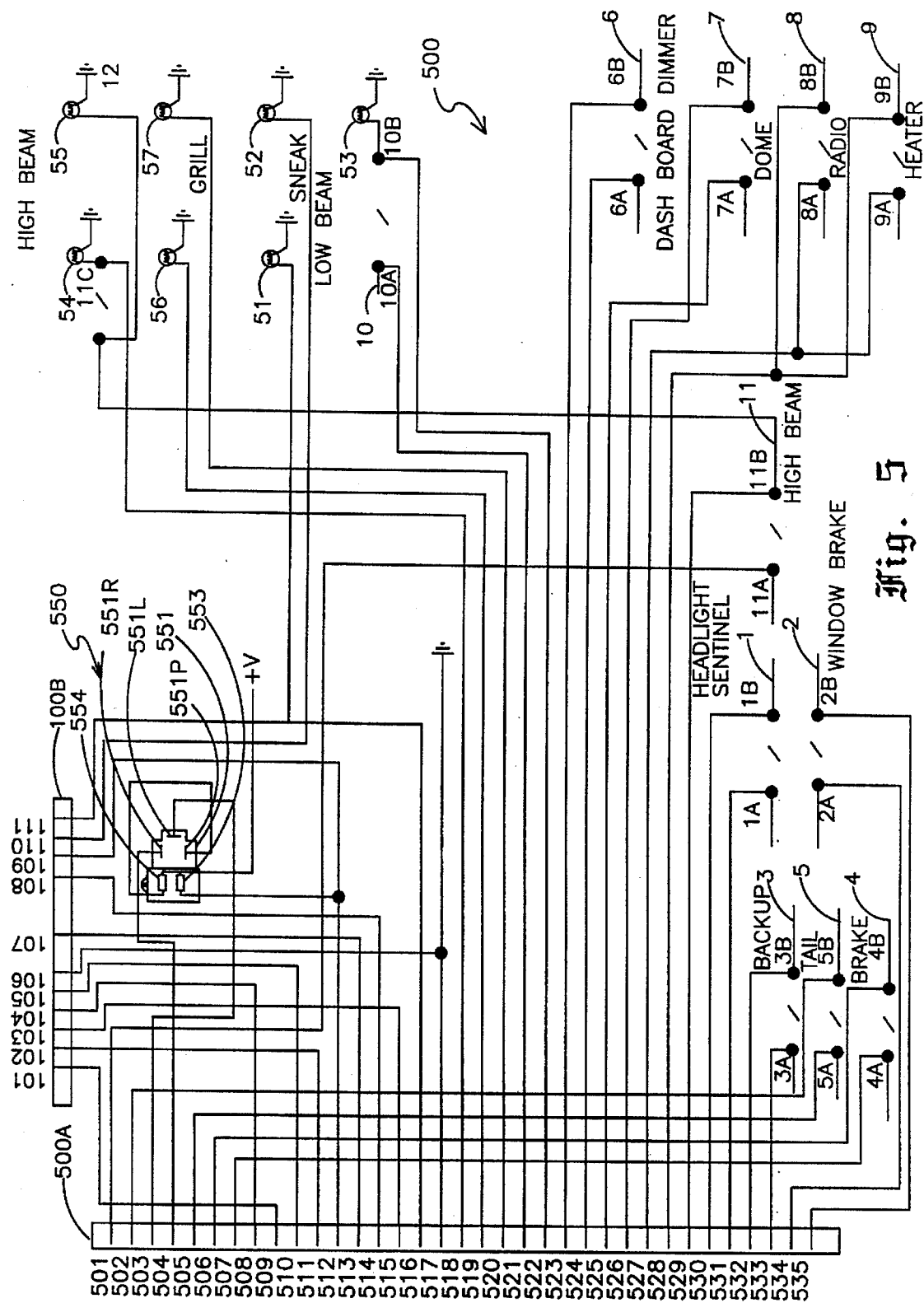
FIG. 5 is a wiring diagram for a second harness unit attachable to the blackout switch panel unit of FIG. 1 as part of a second embodiment of the present invention.

FIG. 5 illustrates the wiring harness 500 of the second embodiment for the blackout control system of the present invention. The wiring harness 500, like the wiring harness 200 of the first embodiment, is connected to wires 101 through 111 of the switch panel circuit 100; however, the pin connections in the wire socket connector unit 500A are different. The wiring harness 500 has 35 pin connections numbered consecutively from 501 through 535. The wire from the headlight sentinel control 1 is cut and wires 1A and 1B are connected to pins 531 and 530, respectively. The wire from the rear window brake light 2 is cut and wires 2A and 2B are connected to pins 534 and 535, respectively. The wire from the backup lights 3 within the vehicle being cut, wire 3A is connected to pin 533 of the wire socket connector unit 500A, and wire 3B is connected to pin 532. The wire from the brake lights 4 being cut, wire 4A is connected to pin 507, and wire 4B is connected to 506. The wire from the tail lights 5 being cut, wire 5A is connected to pin 505, and wire 5B is connected to pin 502. The wire from the interior dome light 7 being cut, wire 7A is connected to pin 525, and wire 7B is connected to pin 526. The wires from the radio 8 and heater 9 are cut, wires 8A and 9A from each element connected to pin 527, and wires 8B and 9B from each element connected to pin 528. The wire from the dimmer switch 6 being cut, wire 6A is connected to pin 524, and wire 6B is connected to 523. In addition to the aforementioned wires of the vehicle, the harness 500 is connected to the high beam headlights of the vehicle. The wire 11A of the high beam headlights 11 leads to a left high beam light 54. A wire 12 is connected to wire 1ib to provide power to the right high beam light 55. The wire 1ib is cut into three sections. Section 11A is connected to pin 501 and leads to the high beam headlight switch. Section 11B is connected to pin 529 and activates the right high beam headlight 55 through line 12. Section 11C is connected to pin 518 and leads to the left high beam headlight 54. Unlike the first embodiment, the harness 500 is connected to the red grill lights of the vehicle located either in front of the grill or in front of the radiator behind the grill and between the headlights. The left red grill light 56 is connected to pin 519, and the right red grill light 57 is connected to pin 520. The Reds 1–3 are activated through the use of any of the red lights' switches 20, 21 and 22 by virtue of relays R101 and R102 in FIG. 1. As in the first embodiment with Reds 1–3, the tail-lights' blackout switch 24 disables the tail, radio, and heater lights, headlight sentinel control, and dashboard lights dimmer of the vehicle. Likewise, the brake blackout switch 23 disables the brake, rear window brake, backup, and dome lights. The optional interior dome blackout switch S601 (FIG. 6) when closed will allow power from Red switches 20, 21 and 22 to pass through the diodes D603, D604 and D606 to pass through diode D605 through switch S601 to the interior dome light blackout relay R603 which opens the circuit to pin 625 and pin 626. The sneak light switch 25 turns on the sneak lights 51 and 52 in front of the vehicle.

The wire 10 energizing the right low beam headlight 53 is cut in order to perform a black eye disguise maneuver, wherein an officer will return to view the suspect's vehicle with only the left headlight on so as not to alert the suspect that the same vehicle is returning. The wire 10A of the low beam headlight 10 is connected by pin 521 and powers the left low beam headlight while the loss of power to side 10B of the right low beam headlight 53 nullifies pin 522.

The harness unit 500 also has a flasher unit 550 having flasher 551 connected thereto along with two fuses 553 and 554. The flasher unit 550 is any typical flasher unit used in vehicles, such as those made by Packard Electric. Since the flasher 551 uses two outputs, model Dominion 743100 can be used. The positive end of the battery supplies power to the fuses 553 and 554. The fuse 554 has the same current level rating as the fuse 553 and is used to supply the flasher 551. Fuse 353 passes current to the blackout switches 23–25 and Reds 1–3.

With the blackout switch panel circuit 100 of FIG. 1 combined with the wiring harness of FIG. 5, Red 1 (rocker switch 20) will flash all lights on Red 1, Red 2 and Red 3 with the addition of high beam headlights 54 and 55, Red 2 (21) will flash the red grill lights 56 and 57, and Red 3 (22) will be a spare switch for the officer to add additional lighting.

Figure 6:
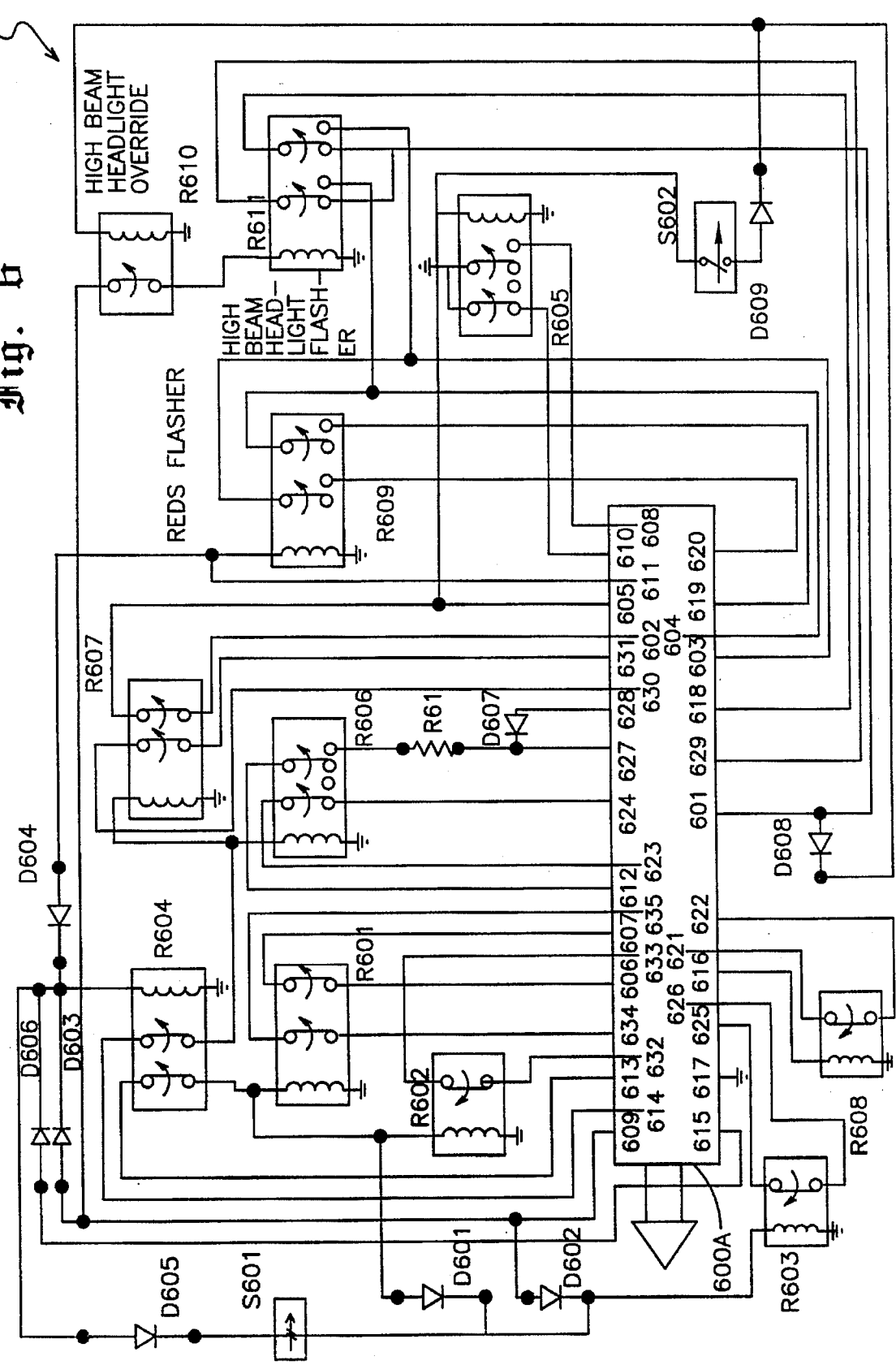
FIG. 6 is a wiring diagram for a second control unit attachable to the second harness unit of FIG. 5 as part of the second embodiment of the present invention.

In FIG. 6, the blackout control unit 600 has a wire plug connector unit 600A capable of being connected to the wire socket connector unit 500A. When the wire socket connector 500A is plugged into the wire plug connector 600A, each of the pins 501 through 535 of the wiring harness 500 is connected to the corresponding pins 601 through 635 of the wire plug connector unit 600A. As in the first embodiment, with all of the relays of the and blackout control unit 600 deactivated, the electrical connections of the vehicle are identical to those prior to the installation of the harness 500.

Once the brake blackout switch 23 is activated with the switches of the blackout override relay R604 closed, allowing power to pass to relays R601, R602 and to the interior dome light blackout relay R603. Upon activation of relay R603, pins 625 and 626 connecting the wires 7A and 7B, respectively, of the interior dome light 7 are disconnected, thereby preventing the dome (or courtesy) light 7 from coming on. Also, pins 606 and 607 are disconnected from the brake and rear window brake lights blackout relay R601, preventing power coming from wire 4A of the brake switch from being supplied to wire 4B leading to the brake lights 4. Blackout relay 601 when activated also disconnects pins 634 and 635 connected to wires 2A and 2B, respectively, of the window brake light 2 to prevent the rear window brake light 2 from coming on. Power is also supplied to backup lights blackout relay R602 with blackout override relay R604 closed. Upon activation of relay R602, pins 632 and 633 which connect wires 3B and 3A, respectively, of the backup lights 3 (FIG. 5, pins 532 and 533) are disconnected, thereby preventing the backup lights 3 from coming on.

When the taillights blackout switch 24 is activated, power is supplied to the relay coil of the dimmer, radio display and heater control display blackout relay R606 from pin 614 through the blackout switch relay R604. Once the relay R606 is activated, current from pin 612 is connected to pin 627, directing power to wires 8A and 9A (FIG. 5), whereby both radio and heater control displays are placed in their nighttime mode. Note that power is allowed to flow from the running lights' switch to the radio and heater lighting arrangements through the use of diode D607. However, the diode D607 prevents power from flowing to the vehicle's running lights' switch in order to prevent the running lights from being turned on by power coming from pin 612.

Also, when the taillights blackout switch 24 is activated, power is supplied to the relay coil of the taillights and the headlight sentinel blackout switch relay R607. When the relay R607 is activated, pins 630 and 631 are disconnected, thereby disconnecting wires 1A and 1B so as to prevent power from the vehicle from powering the headlight sentinel control module. Further pins 602 and 605 are disconnected so as to disconnect wires 5A and 5B of the taillights switch 5, thereby preventing power from reaching the vehicle running lights.

The power supplied to pin 611 is used to activate the relay coils of the brake, tail and backup lights override relay R604 and the Reds' flasher relay R609. With the blackout override relay R604 activated, the blackout relays R601 (brake and rear window brake lights), R602 (backup lights), R606 (dimmer, radio display and heater display), and R607 (taillights and headlights sentinel control module) cannot be activated (the interior dome light 7, could be activated by pin 609 if switch S601 is open), or R601, R602, R606 and R607 are deactivated if they have already been activated. In this manner, the brake lights, backup lights, and taillights function normally.

In FIG. 5, flasher 551 has an output 551R connected to pin 504 and an output 551L connected to pin 503. The outputs 551R and 551L alternately share the power supplied by the input 551P of the flasher 551. In this manner, power is supplied to pin 503 half of the time and to pin 504 the other half of the time. With relays R611 (high beam headlight flasher relay) and R609 (Reds flasher relay) activated, the left high beam headlight 54 is controlled by the flasher 551. The right red grill light 57 is also controlled by the flasher 551. The right high beam headlight 55 and the left red grill light 56 are controlled by the flasher 551. In this manner, the right red grill light 57 and the right high beam headlight 55 alternately flash as do the left red grill light 56 and the left high beam headlight 54. A conventional wigwag effect of the lights is produced, since the right red grill light 57 and the left high beam headlight 54 are on at the same time and alternate with the left red grill light 56 and the right high beam headlight 55 on at the same time.

When a police department uses smaller unmarked vehicles than the large marked squad cars, red grill lights cannot be placed on the small vehicles due to limited space between the headlights. Therefore, the turn signal lights are utilized in place of the red grill lights to enable the wigwag flashing of the high beam headlights with the turn signal lights.

The blackout control unit 600 of FIG. 6 includes a high beam headlight override relay R610 for preventing the power from the Red 1 lights' switch 20 from reaching the relay coil of the high beam headlight flasher relay R611. With the relay R611 maintained in its deactivated state, pin 601 is connected to pins 618 and 629, leading to the left high beam headlight 54 and the right high beam headlight 55, respectively. Thus, the high beam headlight switch of the vehicle operates the high beam headlights in the normal fashion. Note, that the Reds' flasher relay R609 may still be energized, allowing the flasher 551 to alternately flash the left and right red grill lights even with the high beam headlight override relay R610 activated. It should be noted that the red grill lights can be positioned either behind or in front of the emergency vehicle's front grill, i.e., proximate to the grill, and between the headlights.

The high beam headlight override relay R610 is activated by the high beam headlight switch through power supplied thereby to pin 501, leading to pin 601, and leading to diode D608 which allows power to pass from pin 601 to the relay coil of the high beam headlight override relay R610. The relay R610 is also activated by a nighttime high beam headlight override switch S602 which, when activated, supplies power normally going to the switch from wire 5A of the tail lights 5 (FIG. 5) to pin 505, allowing the power coming from pin 605 of the wire plug connector unit 600A to pass through slide switch 602 (switch for the nighttime high beam headlight flasher override) through diode D609 to the coil of the relay R610 (high beam headlight override), thereby disabling the relay R611 (high beam headlight flasher).

If the officer forgets to turn off the blackout rocker switches of the blackout switch panel A, not using any of the emergency switch arrangements, the lights in the rocker switches will come on to full intensity once the headlights are turned off, thus alerting the officer to the blackout switch operation. This warning is accomplished by the deactivated mode or grounding of the pin 610 of the day and night relay R605 supplying grounding to blackout switches 23, 24 and 25 by the switch panel circuit (100) pin 105 (FIG. 1). The day and night relay R605 is activated by the vehicle running lights' switch connected to the tail lights 5. Relay R605 also supplies a ground going through the panel lights override relay R103 (FIG. 1) to supply ground for the illuminating panel lights 50 when activated.

Switch S601 when on supplies power to the interior dome light relay R603 to prevent the dome light from coming on when any of the emergency lights are on. Activation of the Reds flasher relay R609 by pin 611 supplies power through diode D604 to diode D605 (but not through diodes D603 and D606) and switch S601 when on (but not through diodes D601 and D602) to prevent feedback to the blackout relays R601 (brake and rear window brake lights) and R602 (backup lights).

Figure 7:
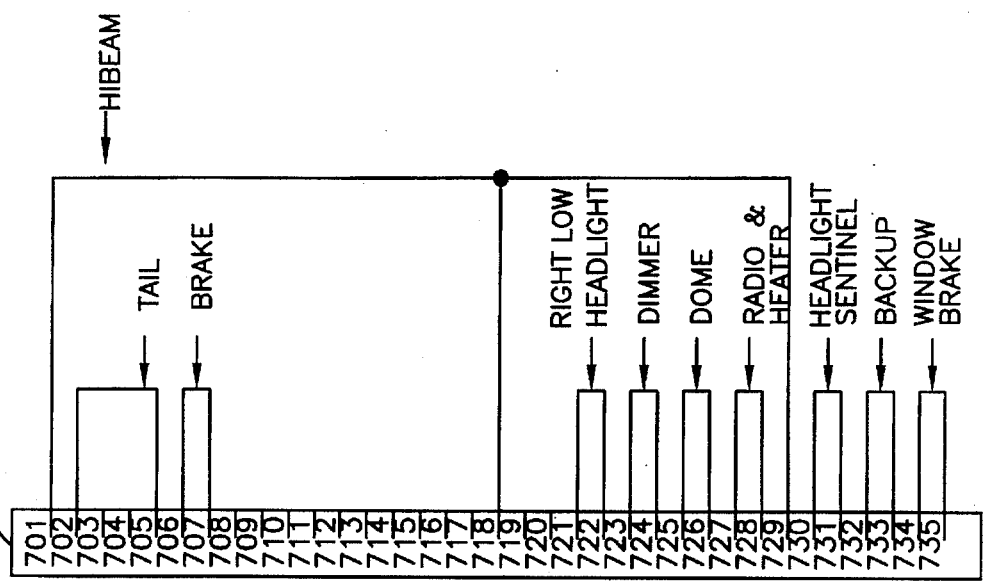
FIG. 7 is a second bypass plug-in unit which can be connected to the wiring harness unit of FIG. 5 to nullify the blackout control system of FIGS. 1, 5 and 6.

FIG. 7 illustrates the bypass plug-in unit 700A which replaces blackout control unit 600. The replacement procedure is similar to that described earlier for installing bypass plug-in unit 400A. A third embodiment for the blackout control system of the present invention is illustrated in FIG. 8 (harness unit 800) and FIG. 9 (control unit 900). The third embodiment is similar to the second embodiment of FIGS. 5 and 6. However, the third embodiment includes a flasher arrangement for the backup lights and brake lights. As shown in FIG. 8, the wiring harness 800 has a wire socket connector unit 800A attached at one end thereof, and is connected to the control unit 900 and the electrical lighting system of the vehicle at the other end. Like the wiring harness 500 of the second embodiment, the wiring harness unit 800 is connected to wires 101 through 111 of the blackout switch panel unit 100 of the vehicle. The vehicle wires are cut as described in the second embodiment above, and the cut wires are connected to their corresponding pins as follows: 1A and 1B (headlight sentinel) to 828 and 827, respectively; 2A and 2b (rear window brake light) to 837 and 836; 3A and 3B (backup lights) to 809 and 808; 4A and 4B (brake lights) to 834 and 833; 5A and 5B (taillights) to 810 and 811; 6A and 6B (dashboard dimmer) to 830 and 829; 7A and 7B (interior dome light) to 826 and 818; 8A and 9A (display lights of the digital radio and heater, respectively) to 831; 8B and 9B to 835; 10A (right low beam headlight) to 824; and 10B (right low beam headlight) to 825.

In the third embodiment of the wiring harness unit 800 shown in FIG. 8, the wire connecting the backup lights 3 is cut to produce wires 3A and 3B. Wire 3A goes to pin 809 and wire 3B is connected to pin 808. With the additional individual connections of the wiring harness 800 to the right and left backup lights 3 and the right and left brake lights 4, a flashing effect of the backup and brake lights is achieved. This is accomplished by using a conventional flasher unit 850. The flasher unit 850 uses conventional flasher 851 and 852, both of which may be model Dominion 743100 since they each have two outputs. The flasher unit 850 has two fuses 853 and 854. Fuse 854 has the same amperage rating as fuse 853, and fuse 854 is used to power the flashers 851 and 852 of the flasher unit 850 under the control of the illuminated switch panel A discussed below. Fuse 853 controls the blackout relays of the blackout controller 900 as discussed below.

Figure 9:
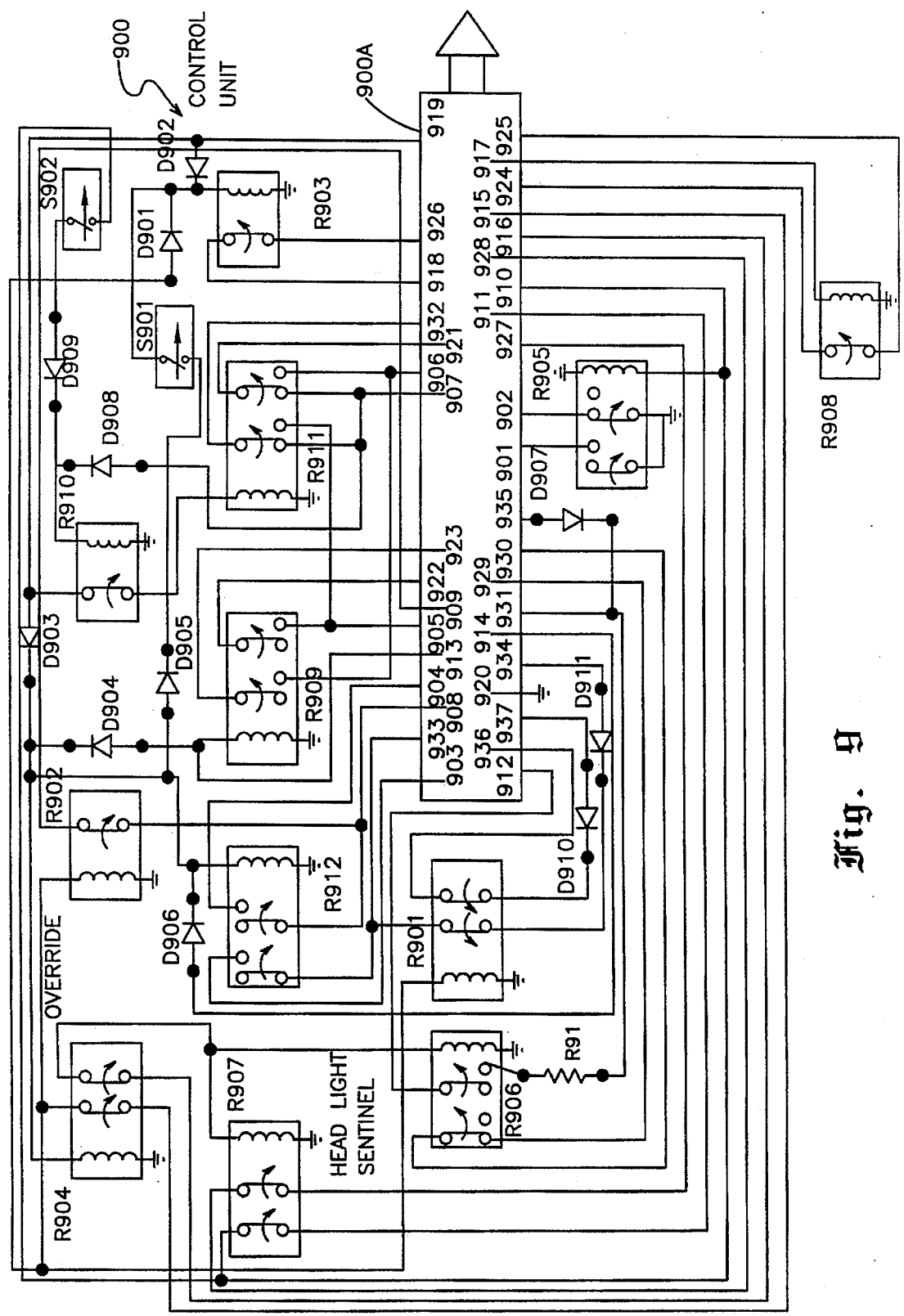
FIG. 9 is a wiring diagram for a third control system unit attachable to the third harness unit of FIG. 8 as part of the third embodiment of the present invention.

As shown in FIG. 9, the blackout control unit 900 has similar blackout features as blackout control unit 600. More specifically, the power to the taillights and headlight sentinel control module is controlled by the tail and headlight sentinel blackout relay R907. Relay R907 normally provides a connection between the taillights (or the vehicle's running lights switch) and said lights through a normally closed switch R907 connecting pins 910 and 911. The relay R907 also normally provides a connection for the headlight sentinel control through a normally closed switch connecting pins 927 and 928. The brake and backup lights' flasher relay R912 is used to power the flasher 852 by pin connection 903 leading to the output 852L of the flasher 852 and pin connection 904 leading to the output 852R of the flasher 852.

Further, the brake and rear window brake light blackout relay R901 and the interior dome lights' relay R903 and backup lights blackout relay R902 are used to black out the rear window brake lights 2, the backup lights 3, the brake lights 4, and the interior dome light 7, upon the activation of the brake blackout switch 23 connected to pins 815 and 915. The power is transmitted through the brake, tail and backup lights' override relay R904 to the relays R901, R902 and R903. Diodes D910 and D911 are positioned in the lines coming from pins 937 and 934, respectively, to the normally closed relay R901 in order to prevent feedback from the rear flashing lights (brake and rear window brake) from affecting the vehicle's modular computer. Power supplied to pin 916 activates the relay R906 so as to interrupt the connection made between pins 929 and 930, which disconnects wire 6A supplying power from the dimmer switch to wire 6B leading to the dashboard dimmer and the radio lights. The power from pin 912 leading to R906 diverts power through pin 931 to wires 8A and 9A (FIG. 8) to place the digital displays of the radio and heater control displays in their nighttime mode of operation as discussed with the other embodiments above. A diode D907 allows power from wires 8B (radio display) and 9B (heater display) coming from the vehicle's running light switch to go to wires 8A and 9A, while preventing the power supplied to wires 8A and 9A from being fed into the running light switch by 8B and 9B which would turn the running lights on. Note that a brake, tail and backup lights' override relay R904, deactivates the blackout features of the blackout control unit 900 in the same manner as R604 discussed above.

The flasher features of the blackout control unit 900 are similar to those of blackout control unit 600. Relay R909 (Reds flasher relay) connects the red grill lights 56 and 57 to the flasher unit 850 when activated in the same manner as R609 (Reds flasher) of the control unit 600 connects the red grill lights 56 and 57 to the flasher unit 550. It should be noted that the existing turn signal lights are substituted for the red grill lights for the smaller unmarked vehicles (not shown). Relay R911 connects the high beam headlights 54 and 55 to the flasher unit 850 in the same manner as R611 of the control unit 600 connects the high beam headlights 54 and 55 to the flasher unit 550 when activated.

Each flasher 851 and 852 has one input for power and two outputs. Flasher 850 is connected to the power from fuse 854 via input 851P, and flasher 852 is connected to the power from fuse 854 via input 852P. Flasher outputs 851L, 851R, 852L, and 852R are connected to pins 806, 805, 803, and 804, respectively. As shown in FIG. 8, these pins lead to open connections to the various relays controlling the flashing features. Thus, the flashers 851 and 852 are not activated, since they are not connected to lights.

With the activation of the Red 1 switch 20, power is supplied to pin 919 of the control unit 900. This power also activates the relay coil of the blackout override relay R904 to deactivate the blackout features of the control unit 900 as discussed above. Further the high beam headlights flasher relay R911 is activated through the normally closed switch of the high beam headlights override relay R910 through pin 919. The brake and backup lights' flasher relay R912 is activated through Reds 1, 2 and Red 3 (20-22, FIG. 1) by pins 919, 913 and 914. The red grill lights' relay R909 is activated through pin 913. In this manner, the connection to the left high beam headlight 54 through pin 821 is changed to pin 806 leading to the output 851L as controlled by relay R911, while the connection to the right high beam headlight 55 through pin 832 is changed to pin 805 leading to output 851R. Likewise, the outputs 851L and 851R are connected to pins 806 and 805, respectively, through the activation of the red grill lights relay R909. Pins 922 and 923 lead to the left grill light 56 and the right grill light 57, respectively. Thus, through the use of relays R909 and R911, the same wigwag effect of the high beam headlights 54 and 55 along with the red grill lights 56 and 57 (or turn signal lights) is achieved through control unit 900 as is achieved through control unit 600 described above. Relay R909 when activated, permits the energization of the coil in blackout override relay R904 by way of diode D904. When pin 919 is activated by the Red 1 switch (20) through pin 819, diode D903 permits the energization of the coil in the brake, tail and backup lights' override relay R904. The slide switch S902 for the nighttime flasher override R910, when closed, permits the override of the high beam headlights flashing by passing the current through diode D909 to relay R910. When the Red 3 rocker switch 22 is energized, current from pin 914 passes through diode D906 to energize the coil in the brake and backup lights' flasher relay R912 and the coil in the brake, tail and backup lights' override relay R904. With slide switch S901 open, relays R901, R902, R903, R906, and R907 are de-energized when the brake, tail and backup lights' override relay R904 is energized by activation of either Red 2 (switch 21) or Red 3 (switch 22).

The high beam override relay R910 overrides the high beam headlight flasher function upon activation of the high beam headlight switch supplying current to pin 907, which current passes through the diode D908 and energizes the coil of the high beam headlights' override relay R910. Further, the relay R910 may also be energized upon activation of the vehicle running lights' switch from pin 810 which supplies power to pin 910 upon activation of the running lights. Diode D909 prevents power from the high beam headlight switch from being channeled to the running lights, and diode D908 prevents power from the running lights' switch from reaching the output of the high beam headlights' switch. With the activation of relay R912, a flash pattern is activated with both brake lights on with both backup lights off, and then both backup lights on with both brake lights off. The relay R912 connects the backup lights to the output 852R by connecting pin 904 to pin 908. The relay R912 also connects the rear brake lights to the output 852L by connecting pin 903 to pin 933. In this manner, the backup lights are simultaneously on for half of the time, and the brake lights are simultaneously on for the other half of the time. This produces the flashing effect for the brake lights and backup lights.

Figure 10:
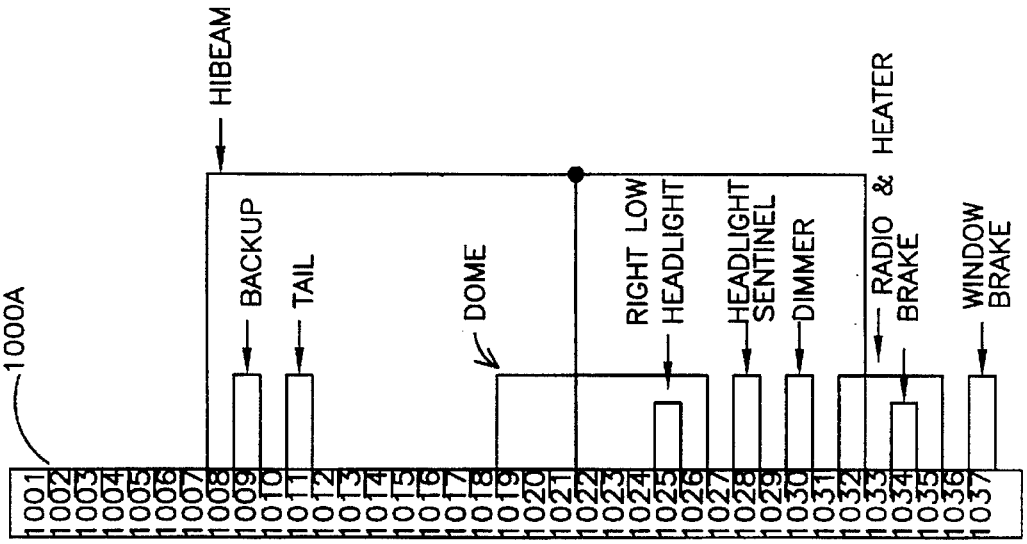
FIG. 10 is a third bypass plug-in unit which can be connected to the wiring harness unit of FIG. 8 to nullify the blackout control system of FIGS. 1, 8 and 9.

In FIG. 10 the bypass plug-in unit 1000A connects to bypass the control unit 900 of FIG. 9, thus restoring the vehicle to its original lighting condition. These bypass plug-in units 400A, 700A and 1000A can be attached to their respective blackout harness units 200, 500 and 800. The pertinent connections for each bypass plug unit are labeled.

This feature will allow the officer to bypass the blackout control units for servicing of the emergency lighting system in a modified vehicle and return the vehicle back to its original lighting condition. The use of these bypass plug-in units can save the police department in expensive stripping costs for resale.

The blackout control panel system can be advantageously combined with a siren control head, i.e., using the siren with the present blackout lighting.

It is to be understood that the present invention is not limited to the embodiments described above, but encompasses any and all embodiments within the scope of the following claims.

I claim:

1. An improved blackout control system for use in an emergency vehicle having emergency lights including, high and low beam headlights, running lights, front lights selected from red grill lights and turn signal lights, a rear window brake light, brake lights, and backup lights controlled by a backup switch for supplying power to backup lights of the vehicle when the vehicle is placed in reverse, a manually activated running light switch to provide power to running lights of the vehicle, an interior dome light activated by opening doors, and a brake switch for supplying power to brake lights of the vehicle when a brake pedal within the vehicle is engaged, said improved blackout control system containing a blackout panel unit, a harness unit and a control unit comprising:

(a) a blackout panel unit comprising:
a first manually activated emergency light switch supplying power to the high beam headlights of the vehicle;
a second manually activated emergency light switch supplying power to red grill lights;
a third manually activated emergency light switch supplying power to brake and backup lights;
a first manually activated blackout switch to deactivate the brake lights;
a second manually activated tail lights' blackout switch to deactivate the running lights;
a third manually operated sneak light switch to activate the sneak lights and to deactivate the right low beam headlight;

(b) a harness unit connected to all the switches in said blackout panel of the emergency vehicle; and (c) a control unit connected to said harness unit and to the lighting system of a vehicle;

wherein when any of the first, second and third emergency light switches is selected, power to the blackout switches for the brake and backup lights, running lights, interior dome light, digital radio display light, digital heater display light, low beam headlights, and the sneak lights is simultaneously interrupted and stay off until the power is restored by a reset means with the exception of the first emergency light switch deactivating the interior dome light.

2. A blackout control system according to claim 1, wherein said blackout panel is illuminated by separate panel lights and each panel switch comprises an illuminated rocker switch and a light emitting diode illuminated upon activation.

3. A blackout control system according to claim 1, wherein the vehicle also includes an ignition switch, a headlight switch, a digital radio display and a digital heater control display, said digital displays operable in a daytime mode in which said digital displays thereof are fully illuminated upon activation of said ignition switch, and a nighttime mode in which said digital displays are partially illuminated upon activation of said running lights' switch, said taillights blackout means, including means for placing said digital displays of both said radio and heater control displays in said nighttime mode of operation, and said tail lights' blackout including means for eliminating power going to said digital displays of both said radio and heater control displays.

4. A blackout control system according to claim 1, wherein said emergency vehicle further includes a highbeam headlight switch to activate right and left high beam headlights, said emergency lights including right and left side emergency red grill lights located proximate to the grill of the vehicle and between said high beam headlights, and front wigwag flasher means activated upon the activation of said manually activated emergency light switch for alternately flashing the right high beam headlight in unison with the left side red grill light and the left high beam headlight in unison with the right side red grill light for a controlled flash pattern.

5. A blackout control system according to claim 4, further including a high beam headlight override means for deactivating said front wigwag flasher means in response to the activation of said high beam headlight switch.

6. A blackout control system according to claim 4, further including a manually activated front headlight flasher override switch for deactivating said front headlight flasher means upon activation of the running lights' switch.

7. A blackout control system according to claim 1, wherein the first emergency light switch activates the flashing of the headlights with front lights selected from the red grill lights and turn signal lights, backup lights and brake lights, wherein the rear brake lights alternate flashing with the backup lights, and the interior dome light is deactivated.

8. A blackout control system according to claim 1, wherein the first emergency light switch activates the second and third emergency light switches, whereby all emergency lights are activated for a pursuit.

9. A blackout control system according to claim 1, wherein the second emergency light switch activates the flashing of the lights selected from red grill lights and the turn signal lights with the brake lights and backup lights, and inactivates the interior dome light.

10. A blackout control system according to claim 1, wherein activation of the third emergency light switch alternately flashes said brake lights with said backup lights and deactivates the interior dome light.

11. A blackout control system according to claim 1, wherein the first blackout light switch additionally deactivates the brake lights, the backup lights and the interior dome light.

12. A blackout control system according to claim 1, wherein the second blackout light switch additionally deactivates the lighting of the running lights, the headlight sentinel, the digital radio display, and the digital heater display.

13. A blackout control system according to claim 1, wherein the third blackout light switch additionally activates sneak lights at high and low illumination.

14. A blackout control system according to claim 1, wherein the blackout switch panel unit is combined with a siren control head.

15. A blackout control system according to claim 1, wherein a bypass plug-in circuit unit is inserted onto said harness unit to replace said control unit to return the vehicle to its original lighting condition.

16. A blackout control system according to claim 1, wherein the blackout switches return to full illumination after the operator turns off the headlights as a safety feature.

17. A blackout control system according to claim 1, wherein the illumination of the blackout switches is lowered to minimize glare while the user drives in a blackout phase.

18. A blackout control system according to claim 1, wherein the interior dome light is prevented from illuminating when any of the first, second and third emergency light switches are engaged.

19. A blackout control system according to claim 1, wherein a headlight sentinel blackout means is provided to deactivate the headlights in the daytime or in the nighttime mode.

* * * * *